United States Patent
Bagley

(10) Patent No.: US 9,863,799 B2
(45) Date of Patent: Jan. 9, 2018

(54) POWDERED SUGAR SCOOP

(71) Applicant: Progresssive International Corporation, Kent, WA (US)

(72) Inventor: Justin Bagley, Seattle, WA (US)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 0 days.

(21) Appl. No.: 14/862,720

(22) Filed: Sep. 23, 2015

(65) Prior Publication Data

US 2016/0096676 A1   Apr. 7, 2016

Related U.S. Application Data

(60) Provisional application No. 62/059,487, filed on Oct. 3, 2014.

(51) Int. Cl.
| | |
|---|---|
| B65D 83/06 | (2006.01) |
| B65D 43/20 | (2006.01) |
| B65D 43/22 | (2006.01) |
| G01F 19/00 | (2006.01) |

(52) U.S. Cl.
CPC .......... *G01F 19/002* (2013.01); *B65D 43/20* (2013.01); *B65D 43/22* (2013.01); *B65D 83/06* (2013.01)

(58) Field of Classification Search
CPC ....... G01F 19/002; B65D 83/06; B65D 43/20; B65D 43/22
See application file for complete search history.

(56) References Cited

U.S. PATENT DOCUMENTS

| | | | | |
|---|---|---|---|---|
| 464,393 | A * | 12/1891 | Scheid | G01F 19/002 73/426 |
| 1,324,264 | A * | 12/1919 | Parent | G01F 19/00 211/184 |
| 1,619,878 | A * | 3/1927 | Morgan | A61J 7/0023 116/308 |
| 2,034,733 | A * | 3/1936 | Wilkins | G01N 1/08 30/324 |
| D120,759 | S * | 5/1940 | Obryon | D10/46.3 |
| 2,259,504 | A * | 10/1941 | Wilson | G01F 19/002 30/326 |
| 2,555,956 | A * | 6/1951 | Chester | G01F 19/002 73/429 |
| 2,570,521 | A * | 10/1951 | Chester | G01F 19/002 99/323 |
| 2,626,526 | A * | 1/1953 | Chester | G01F 19/002 73/429 |
| D299,303 | S * | 1/1989 | Strobel | D7/667 |
| D339,992 | S * | 10/1993 | Goldman | D10/46.2 |
| 5,460,042 | A * | 10/1995 | Tucker | G01F 19/002 73/426 |
| 5,678,450 | A * | 10/1997 | Robbins | G01F 19/002 73/426 |
| 6,408,521 | B1 * | 6/2002 | Pye | A47J 43/281 30/141 |
| 7,661,310 | B2 * | 2/2010 | De Laforcade | G01F 19/002 141/108 |

* cited by examiner

*Primary Examiner* — Frederick C Nicolas
(74) *Attorney, Agent, or Firm* — Lowe Graham Jones PLLC

(57) ABSTRACT

A scoop for use in scooping and dispensing a powdered item such as powdered sugar includes a first bowl or spoon connected to a second bowl or spoon by a stem. A lid is attached to the top of the scoop, and is selectively movable to cover the first or second spoon. In some versions, one of the spoons or the lid may include a section of mesh.

17 Claims, 4 Drawing Sheets

POWDERED SUGAR SCOOP

PRIORITY CLAIM

This application claims the benefit of prior U.S. provisional application No. 62/059,487, filed Oct. 3, 2014, the contents of which are incorporated by reference.

FIELD OF THE INVENTION

This invention relates generally to scoops for sugar and spices, particularly including powdered sugar.

BACKGROUND OF THE INVENTION

Powdered sugar and certain other spices are often desired to be sprinkled finely over other food items. For this purpose, a user may use an ordinary spoon, resulting in clumps or dispensing volumes larger than is desired. Strainers can sometimes be used to provide a finer powder, but they are large and bulky, and can cause the sugar or spice to be spread over too large an area, with a lack of control.

SUMMARY OF THE INVENTION

A preferred scoop for use in scooping and dispensing a powdered item such as powdered sugar or similar substances includes a first bowl or spoon connected to a second bowl or spoon by a stem.

In one version of the invention, the first spoon is formed as a circular bowl and is sized with a volume of one tablespoon. In other versions the first spoon may have a different size or shape.

The preferred second spoon is oblong when viewed from the top, and includes sidewalls that curve downward to a floor which is generally flat or planar.

In one version, the second spoon is larger than the first spoon, and may have a volume of several tablespoons. In one example, the second spoon forms a volume of between two and four tablespoons.

The stem joining the first spoon and the second spoon is most preferably formed as a planar shelf between the first spoon and the second spoon.

A lid is configured to be attached to the top of the scoop, and in the illustrated example the lid is formed with an oblong lower rim that is sized to be the same as the size of the oblong upper rim of the second spoon. The lid is further arched upward from its oblong lower rim to define an interior space within the lid.

In one example the lid is substantially the same size as the second spoon, and has an internal volume that is the same as that of the volume within the second spoon. In another example the height of the lid is somewhat shorter than the depth of the spoon, such that the lid defines an interior volume between about one half and one third of the volume defined by the second spoon.

The lower rim of the lid is configured to lie within a plane. Likewise, the stem, rim of the first spoon, and rim of the second spoon all lie within a common plane. The lid is connected to the scoop in a fashion in which the lid can slide along the top of the scoop (including the rims of the first and second spoons and the stem).

In one version, the lid includes a pair of arms formed as clips positioned diametrically opposite one another at central locations on the long sides of the oblong-shaped rim.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
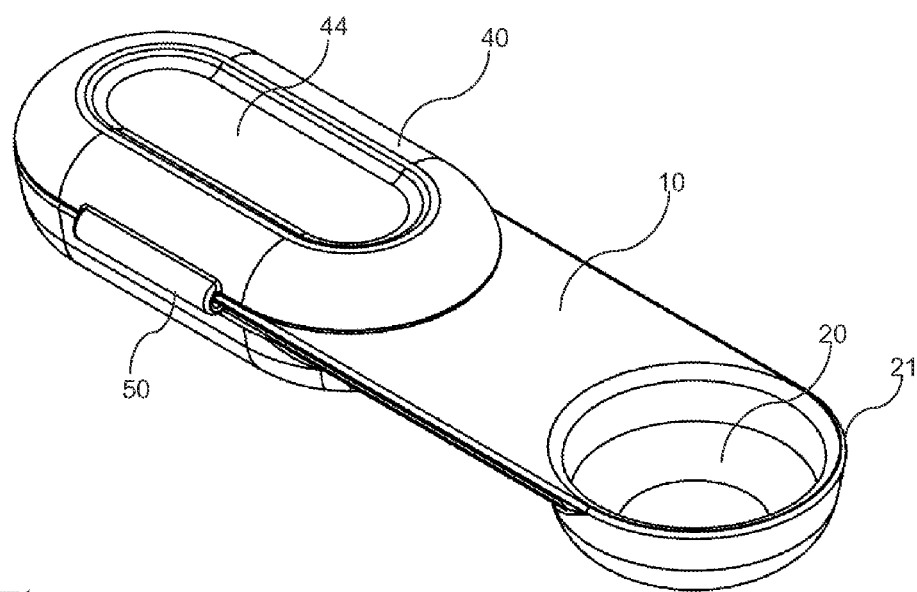
FIG. 1 is a top perspective view of a preferred powdered sugar scoop, illustrated with a first spoon in an open position and a lid covering a second spoon.
Figure 2:
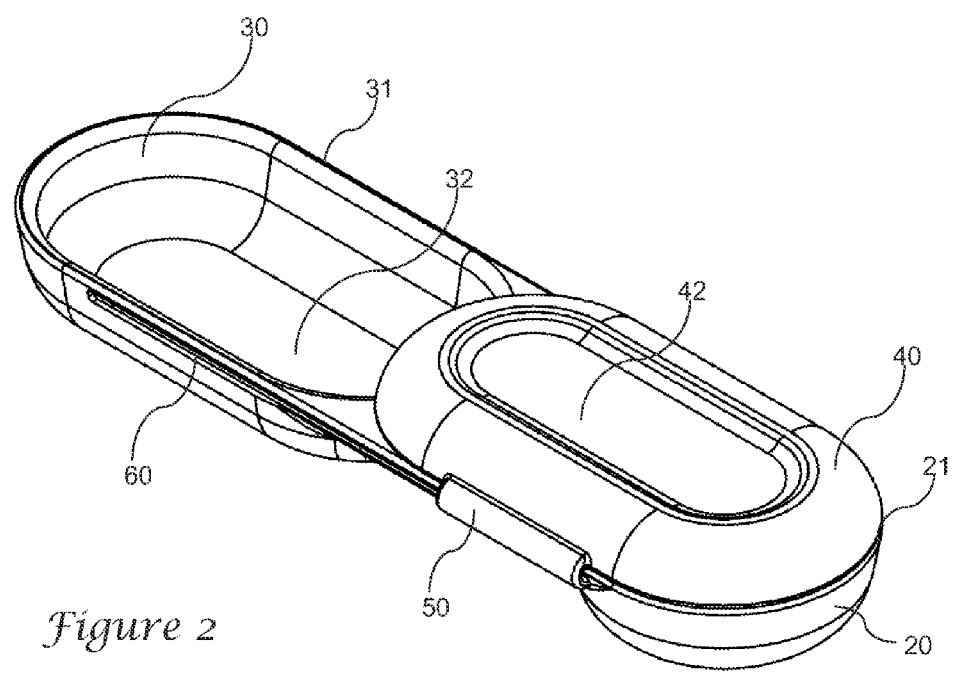
FIG. 2 is a top perspective view of the powdered sugar scoop of FIG. 1, illustrated with the lid covering the second spoon.

The present invention relates to a scoop for use in scooping and dispensing a powdered item such as powdered sugar or similar substances. In the preferred version such as illustrated in FIGS. 1 and 2, the scoop includes a first bowl or spoon 20 connected to a second bowl or spoon 30 by a stem 10.

In one version of the invention, such as in the illustrated version, the first spoon 20 is formed as a circular bowl and is sized with a volume of one tablespoon. In other versions the first spoon may have a different size or shape.

Figure 3:
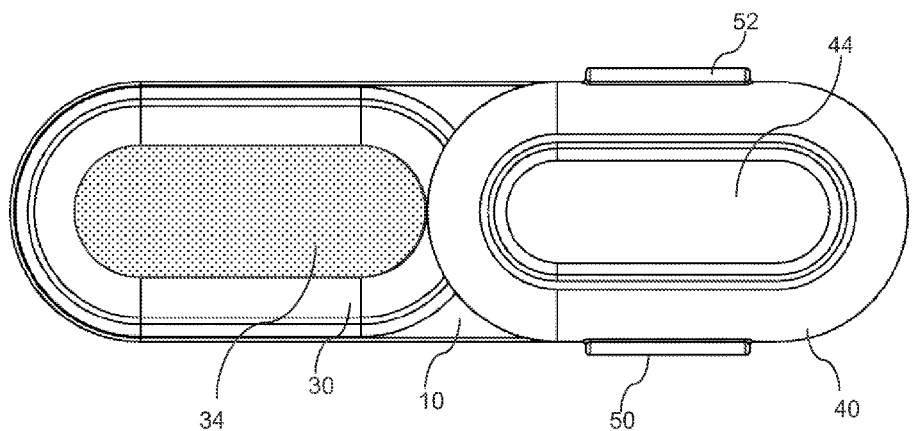
FIG. 3 is a top plan view of a preferred powdered sugar scoop, illustrated with the lid covering the second spoon.
Figure 5:
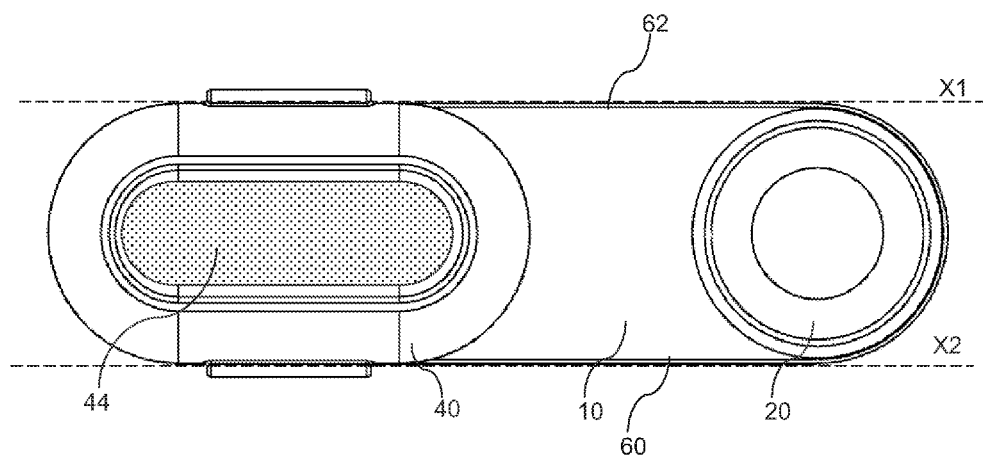
FIG. 5 is a top plan view of an alternate preferred powdered sugar scoop, illustrated with the lid covering the second spoon.

The preferred second spoon 30 is oblong when viewed from the top, such as in the top plan views of FIGS. 3 and 5, and includes sidewalls that curve downward to a floor 32, which in the illustrated example is generally flat or planar.

In one version, the second spoon 30 is larger than the first spoon 20, and may have a volume of several tablespoons. In one example, the second spoon forms a volume of between two and four tablespoons.

The stem 10 joining the first spoon and the second spoon is most preferably formed as a planar shelf between the first spoon and the second spoon.

Figure 6:
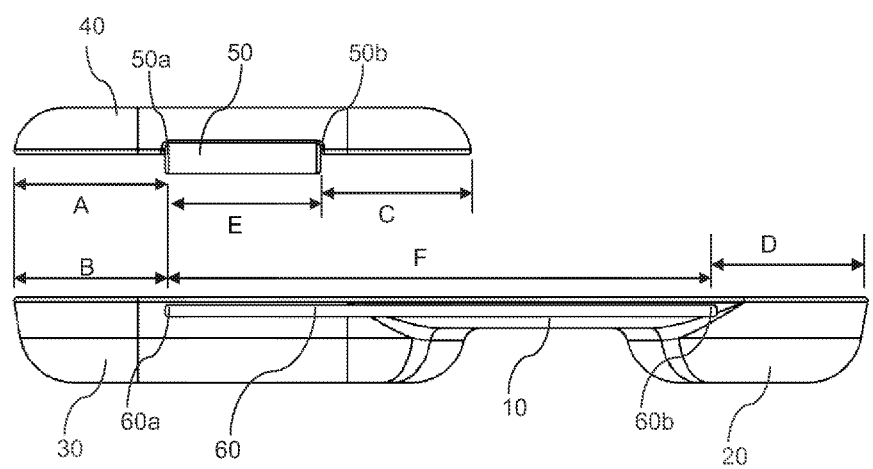
FIG. 6 is an exploded front plan view of a preferred powdered sugar scoop.

A lid 40 is configured to be attached to the top of the scoop, and in the illustrated example the lid is formed with an oblong lower rim 46 that is sized to be the same as the size of the oblong upper rim of the second spoon 30. The lid is further arched upward from its oblong lower rim to define an interior space within the lid, such as best seen in FIGS. 2 and 6. In one example the lid is substantially the same size as the second spoon, and has an internal volume that is the same as that of the volume within the second spoon. In another example the height of the lid is somewhat shorter than the depth of the spoon, such that the lid defines an interior volume between about one half and one third of the volume defined by the second spoon.

Figure 4:
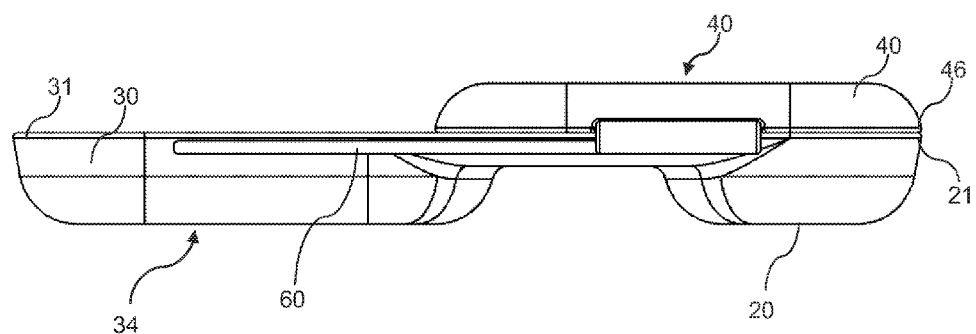
FIG. 4 is a front plan view of the powdered sugar scoop of FIG. 3.

The lower rim 46 of the lid 40 is configured to lie within a plane. Likewise, the stem 10, rim 21 of the first spoon 20, and rim 31 of the second spoon all lie within a common plane, as seen best in FIGS. 1, 2, and 4. As illustrated, the common plane is defined by the configuration of the planar stem 10.

Figure 7:
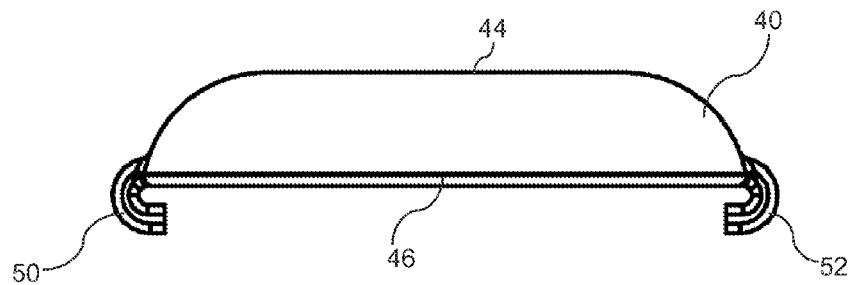
FIG. 7 is a side plan view of a preferred lid for use with a powdered sugar scoop.

The lid is connected to the scoop in a fashion in which the lid can slide along the top of the scoop (including the rims of the first and second spoons and the stem). In one version, such as best seen in FIG. 3, the lid 40 includes a pair of arms formed as clips 50, 52 positioned diametrically opposite one another at central locations on the long sides of the oblong-shaped rim. In the illustrated example, the clips 50, 52 are generally C-shaped, with the open end of each of the C-shapes facing inward toward one another as seen in FIG. 7.

Figure 8:
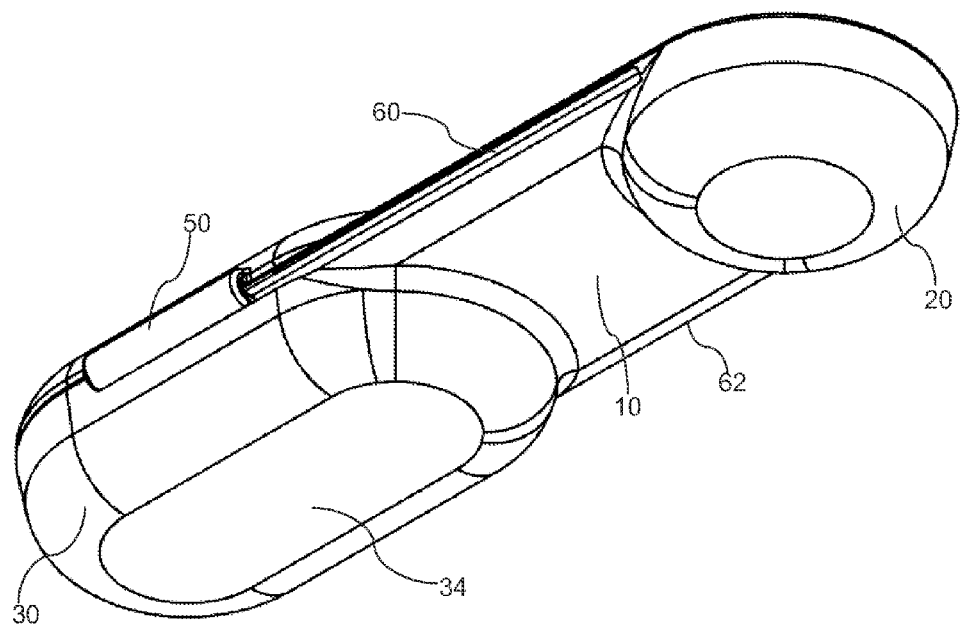
FIG. 8 is a bottom perspective view of a preferred powdered sugar scoop.

The clips are configured to receive an edge of the stem 10 within the open end of the C-shaped clip in order to attach the lid to the scoop. More preferably, as shown in FIG. 8, a pair of channels 60, 62 are formed on the lower end of the edges of the stem, and continue along portions of the outer and upper ends of the first and second bowls, to provide a pathway for travel of the clips within the channels. In one version, the channels are elongated and extend along a pair of parallel axes X1, X2 along opposing sides of the scoop, as seen in FIG. 5. Most preferably, the axes X1, X2 are tangential with the outer lateral edges of the first spoon and the second spoon, as illustrated in each of the figures.

In the illustrated example, the lid, the channels, and the clips are sized to allow the lid to travel between a position covering the first spoon fully at one end (such as the position in FIG. 2) and a position covering the second spoon fully at the other end (such as the position in FIG. 1). Thus, with reference to FIG. 6, the clips 50, 52 extend along the side of the lid 40 along a length E, with the lid extending beyond the clip in a first direction for a length A and extending beyond the clip in the opposite second direction for a length C. In one version of the invention the clip is about a third of the overall length of the lid, and is positioned in the middle of the lid such that a third of the lid is positioned on either side of the opposite ends of the clips.

The channels 60, 62 extend along the sides of the scoop, terminating at a point along the second spoon 30 at a distance B from the end of the scoop. In the preferred example, the distances A and B are equal such that when the clip is moved within the channel to its farthest position toward the end of the second spoon 30, farthest from the first spoon 20, the lid is fully covering the second spoon. Similarly, the channels extend in the opposite direction toward the first spoon and terminate at a point located a distance D from the end of the first spoon. The distance D is preferably equal to the distance C, such that when the lid is moved within the channel to its farthest position toward the end of the first spoon, farthest from the second spoon, the lid fully covers the first spoon. In this second position covering the first spoon, a portion of the lid will also be covering the stem because the lid is larger than the first spoon.

As further shown in FIG. 6, the clip 50 is preferably formed with a first clip terminal edge 50a and a second clip terminal edge 50b, while the channel 60 is formed with a first channel terminal edge 60a and a second channel terminal edge 60b. Though not visible in FIG. 6, the opposing clip and channel are preferably configured in the same manner. When the lid is moved into a first position, covering the first bowl, the second lid terminal edge abuts the second channel terminal edge, thereby serving as a limit to the extent of travel of the lid. Likewise, when the lid is moved into a second position, covering the second bowl, the first lid terminal edge abuts the first channel terminal edge, again limiting the path of travel in the opposite direction. In the second position, the lower rim of the lid closely surrounds the upper rim of the second spoon, as shown.

The planar configuration of the lower rim of the lid, together with the planar orientation of the upper rims of the first and second spoons and the stem, allow the lid to slide along the top of the rims of the spoons and the stem as it travels back and forth within the channel. Most preferably, the lower rim of the lid is configured to be snugly adjacent the upper rims of the spoons and the top of the stem for a snug frictional sliding arrangement.

In use, either of the two spoons may be used to scoop a powdered material such as powdered sugar when the lid is moved into a position away from the desired spoon, thereby leaving the selected spoon open at the top. The lid can then be used to level the top of the spoon by sliding the lid from its retracted position to a position over the top of the spoon, because the rim of the lid is substantially coplanar with the lid of the spoon. In order to fully empty the spoon, the lid is then slid back to its retracted position to expose the contents of the spoon.

In one version of the invention, the spoons and the lid are each formed from a solid material suitable for use with foods, such as stainless steel or other metals, or suitable plastic materials. Thus, in such a version the lid and the spoons are each formed in a manner such that the powdered material cannot pass through the lid or the spoon, and in order to remove the powdered material the lid must be moved laterally away from the appropriate filled spoon so that it is open and can be inverted to dispense the sugar.

In other versions, one or more of the spoons or the lid may be formed from mesh material or otherwise have through-holes formed in them to allow powdered sugar to be shaken from the scoop and to travel out of the spoons via the through-holes formed in either the lid, the spoon, or both. In an example, the first spoon, stem, and second spoon are integrally formed from plastic, with mesh or a plurality of through-holes being formed in the plastic, attached to the plastic, or otherwise incorporated into the plastic.

In one such example, such as illustrated in FIG. 3, a bottom planar portion 34 of the second spoon is formed from mesh 34 or contains a plurality of holes formed in the bottom portion. Alternatively, the entirety of the second scoop may be formed from mesh or have through-holes positioned throughout. When the second scoop is filed with powdered sugar, the lid may be slid over the top of it in order to level off the top of the powdered sugar within the second scoop as the lid encloses it. The sliding action of the lid naturally leaves an empty volume defined by the volume of the lid positioned over the top of the second spoon. This empty volume provides space to allow the powdered sugar to shake back and forth within the combined spoon and lid, facilitating a shaking action to force the powdered sugar through the through-holes.

In another version of the invention, such as illustrated in FIG. 5, through-holes or mesh material may be formed in a top portion 44 of the lid 40, either instead of or in addition to the mesh forming the spoon. Likewise, the entirety of the lid above the rim of the lid may be formed from mesh or may contain a plurality of through holes.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A powdered sugar scoop, comprising:
    a first spoon and a second spoon connected by a stem; and
    a lid attached to the stem and forming an internal volume within the lid, the lid being positioned for slideable movement between a first position in which the lid covers the first spoon and a second position in which the lid covers the second spoon, the second spoon being substantially uncovered in the first position and the first spoon being substantially uncovered in the second position;
    the lid further including a pair of lateral clips, the lateral clips engaging opposing lateral edges of the stem to secure the lid to the stem as the lid moves between the first position and the second position;
    wherein the opposing lateral edges of the stem each includes a channel, the pair of clips further engaging the channels, wherein the channels form a guide for the movement of the lid between the first position and the second position, and further wherein the channels define a limit of a path of travel of the lid.

2. The powdered sugar scoop of claim 1, wherein the lid comprises a lower rim and the second spoon comprises an upper rim, and further wherein the lower rim of the lid encloses the upper rim of the second spoon when the lid is in the second position.

3. The powdered sugar scoop of claim 2, wherein the first spoon comprises an upper rim, and further wherein the upper rim of the first spoon, the stem, and the upper rim of the second spoon all lie in a common plane.

4. The powdered sugar scoop of claim 3, wherein the opposing lateral edges of the stem are tangential with the upper rim of the first spoon and with the upper rim of the second spoon.

5. The powdered sugar scoop of claim 1, wherein the lid further comprises a central portion having a plurality of through-holes.

6. The powdered sugar scoop of claim 1, wherein the second spoon further comprises a central portion having a plurality of through-holes.

7. The powdered sugar scoop of claim 6, wherein the lower rim of the lid and the upper rim of the second spoon are each oblong.

8. A powdered sugar scoop, comprising:
    a first spoon having a first upper rim and defining a first spoon volume, and a second spoon having a second upper rim and defining a second spoon volume, the first spoon and the second spoon being connected by a stem, the first spoon, stem, and second spoon further being integrally formed, the second spoon having a lower portion with a plurality of through-holes; and
    a lid having a lid lower rim, the lid lower rim being substantially the same size and shape as the second upper rim, the lid further defining an interior lid volume, the interior lid volume being less than or equal to the second spoon volume, the lid being attached to the stem and positioned for selective movement between a first position in which the lid covers the first spoon and a second position in which the lid covers the second spoon, the second spoon being substantially uncovered in the first position and the first spoon being substantially uncovered in the second position.

9. The powdered sugar scoop of claim 8, wherein the lid is attached to the stem by a clip and a mating channel, the clip and channel cooperating to define a limit to a path of travel of the lid with respect to the first spoon and the second spoon.

10. The powdered sugar scoop of claim 9, wherein the clip is formed on the lid and the channel is formed on the stem.

11. The powdered sugar scoop of claim 10, wherein the first spoon comprises an upper rim, and further wherein the upper rim of the first spoon, the stem, and the upper rim of the second spoon all lie in a common plane.

12. The powdered sugar scoop of claim 11, wherein the opposing lateral edges of the stem are tangential with the upper rim of the first spoon and with the upper rim of the second spoon.

13. The powdered sugar scoop of claim 8, wherein the lid further comprises a plurality of through-holes, whereby when powdered sugar is stored in the second spoon and the lid is covering the second spoon, the powdered sugar may pass through the through-holes when the powdered sugar scoop is shaken by a user.

14. A powdered sugar scoop, comprising:
    a first spoon having a first upper rim, and a second spoon having a second upper rim, the first upper rim and the second upper rim lying in a common plane, the first spoon and the second spoon being separated from one another and connected by a stem, the stem having opposing lateral edges that are tangential to the first upper rim and the second upper rim; and
    a lid having a lid lower rim, the lid lower rim being substantially the same size and shape as the second upper rim, the lid further defining an interior volume and having an upper portion formed with a plurality of through-holes, the lid being attached to the stem and positioned for selective movement between a first position in which the lid covers the first spoon and a second position in which the lid covers the second spoon, the first spoon being uncovered when the lid is in the second position;
    whereby when there is powdered sugar in the second spoon the powdered sugar can travel through the through-holes when the lid is in the second position.

15. The powdered sugar scoop of claim 14, wherein the lid is attached to the stem by a clip and a mating channel, the clip and channel cooperating to define a limit to a path of travel of the lid with respect to the first spoon and the second spoon.

16. The powdered sugar scoop of claim 15, wherein the clip is formed on the lid and the channel is formed on the stem.

17. The powdered sugar scoop of claim 14, wherein the lid comprises a mesh material, the plurality of through-holes being formed in the mesh material.

* * * * *